(12) United States Patent  
Hudson, Jr.

(10) Patent No.: US 7,512,903 B2
(45) Date of Patent: Mar. 31, 2009

(54) SELECTIVELY DISPLAYING IN AN IDE

(75) Inventor: Thomas R. Hudson, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 11/404,635

(22) Filed: Apr. 13, 2006

(65) Prior Publication Data

US 2007/0245240 A1    Oct. 18, 2007

(51) Int. Cl.
*G06F 3/00* (2006.01)
*G06F 9/44* (2006.01)

(52) U.S. Cl. ............... 715/853; 715/709; 715/749; 715/762; 715/825; 715/854; 717/124; 717/125; 717/126; 717/127; 717/131

(58) Field of Classification Search ............ 715/709
See application file for complete search history.

(56) References Cited

U.S. PATENT DOCUMENTS

| | | | |
|---|---|---|---|
| 5,946,488 A | 8/1999 | Tanguay et al. | |
| 6,715,109 B1 | 3/2004 | Charlet et al. | |
| 6,928,637 B2 * | 8/2005 | Leherbauer | 717/122 |
| 6,993,759 B2 * | 1/2006 | Aptus et al. | 717/170 |
| 2002/0154165 A1 | 10/2002 | Yu | |
| 2003/0105751 A1 | 6/2003 | van Domburg | |
| 2003/0140334 A1 | 7/2003 | Granston et al. | |
| 2003/0142141 A1 | 7/2003 | Brown et al. | |
| 2004/0003119 A1 | 1/2004 | Munir et al. | |
| 2004/0040014 A1 * | 2/2004 | Ball | 717/130 |
| 2004/0117799 A1 | 6/2004 | Brockway et al. | |
| 2004/0172623 A1 * | 9/2004 | Eckels et al. | 717/125 |
| 2004/0205200 A1 * | 10/2004 | Kothari et al. | 709/229 |
| 2004/0225995 A1 | 11/2004 | Marvin et al. | |

OTHER PUBLICATIONS

CvsGui—WinCvs Screen Shots, Jun. 3, 2003.*

* cited by examiner

*Primary Examiner*—Dennis-Doon Chow
*Assistant Examiner*—Yongjia Pan
(74) *Attorney, Agent, or Firm*—Martin J. McKinley; Law Office of Jim Boice

(57) ABSTRACT

A method and system for managing a display of resources in an Integrated Development Environment (IDE) navigation tree is presented. The method includes the steps of receiving an input that defines a user's criterion for viewing a resource in an Integrated Development Environment (IDE) navigation tree; and displaying, in the IDE navigation tree, only resources in a workspace of a user that meet the user's criterion.

6 Claims, 17 Drawing Sheets

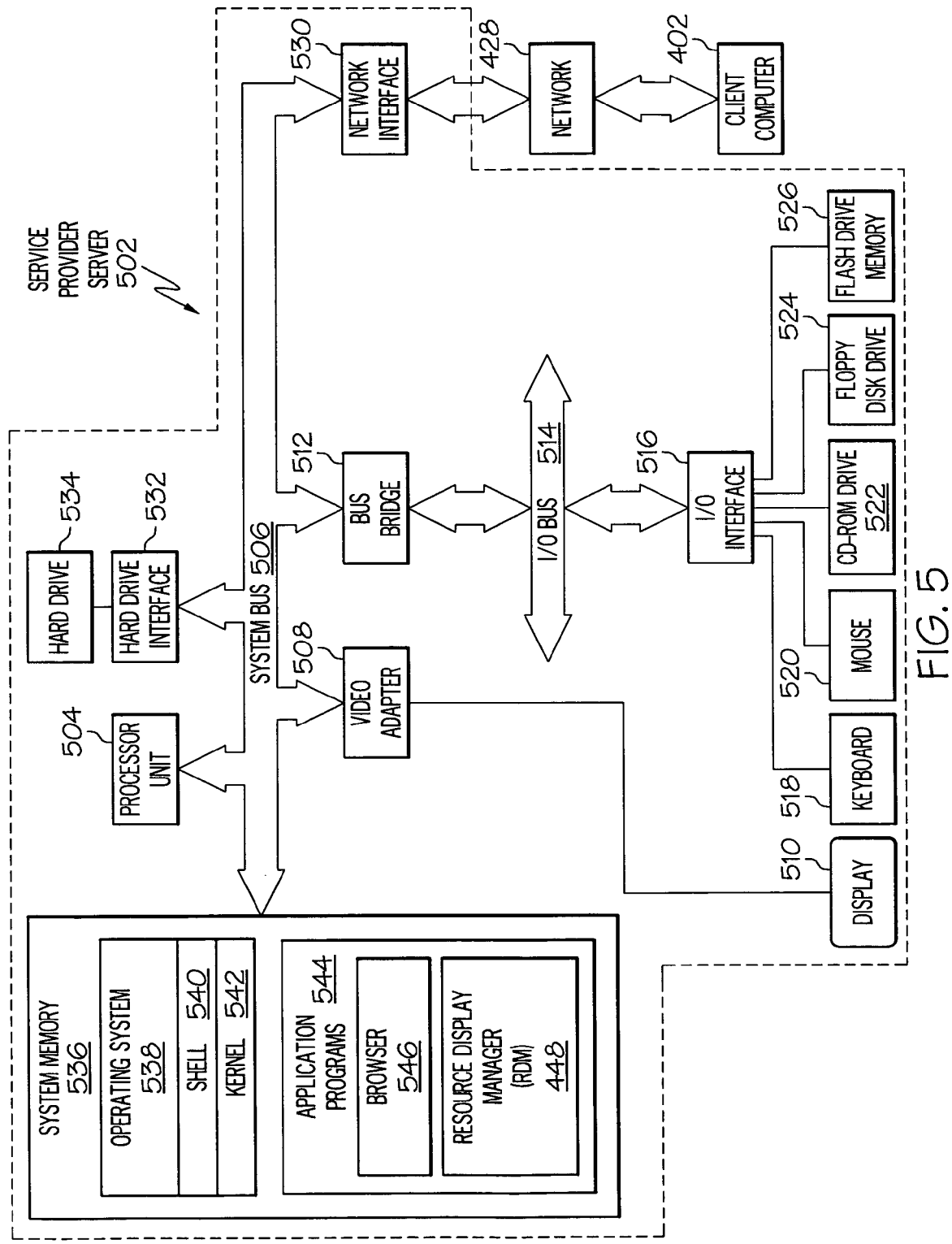

SELECTIVELY DISPLAYING IN AN IDE

BACKGROUND OF THE INVENTION

The present invention relates in general to the field of computers and similar technologies, and in particular to software utilized in this field.

An Integrated Development Environment (IDE) is computer software used to help computer programmers develop code. IDEs normally include a source code editor (either a text or modeling-language-based editor in a first pane of a User Interface—"UI"), a compiler and/or interpreter (underlying software not shown in the UI), build-automation tools (including modeling languages), and a debugger (in a second pane in the UI). The UI often includes a class browser, an object inspector and a class hierarchy (tree) diagram for use with object oriented software development.

The tree diagram presents a relational depiction of resources in the workspace (data and code available in the IDE to the programmer). However, the quantity of these resources causes the tree diagram to quickly become unreadable and unmanageable. Crude filters are available for filtering out files with certain names or certain parameters. In addition, a programmer can locate a particular file by typing in the first few characters in the file's name. However, neither feature of the IDE helps the programmer locate resources that have features, issues, problems or other criteria that are of interest to the programmer.

SUMMARY OF THE INVENTION

To address the problem described above regarding managing tree diagrams, an improved method, apparatus and computer-readable medium is presented. In one embodiment, the method includes the steps of receiving an input that defines a user's criterion for viewing a resource in an Integrated Development Environment (IDE) navigation tree; and displaying, in the IDE navigation tree, only resources in a workspace of a user that meet the user's criterion.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3d describes steps taken when deferring updates to resource changes described in step 308 in FIG. 3a;

FIG. 5 illustrates an exemplary server from which software for executing the present invention may be deployed and/or implemented for the benefit of a user of the client computer shown in FIG. 4;

DETAILED DESCRIPTION OF THE PREFERRED EMBODIMENT

A major problem with many Integrated Development Environment (IDE) displays is the amount of data presented to a user. The IDE often contains a Navigation Tree that depicts an entire content of a workspace. Users may be required to locate certain files in this tree that a) the user has already modified and needs to commit to a shared environment; b) have errors in them and need correction; and/or c) have makers of other kinds in them requiring attention. Prior art filters are capable of removing displayed files, but by definition are unable to display previously blocked (removed from view) files. Thus, the present invention provides an additive method for viewing resources in an IDE. First, some or all resources are blocked from view in the IDE's User Interface (UI). Second, only resources that are of interest to the user are displayed (in a reverse-filtering process). Exemplary criteria that may be used to determine which resources are available for viewing include the following. 1) The resource is an uncommitted outgoing change to a shared team repository of resources such as Concurrent Versions System (CVS), an open-source, network-transparent program that allows developers to keep track of different development versions of source code, Configuration Management Version Control (CMVC) from International Business Machines (IBM), or Clearcase. This is a very useful criterion to use with the present invention since it represents resources that the IDE knows the user is actively working on. The user is likely to continue changing the file, review his changes, and/or commit the changes to the team environment. 2) The resource has (compile) errors in it (presumably caused by the changes to other resources the user has modified.) This is a useful criterion because resources described in 1) which the user changed may introduce errors to untouched resources. 3) The resource has compile warnings. 4) The resource has a specific type of resource marker (such as a "ToDo" directed at the active user.) 5) The resource was modified "recently" by the user, but is already committed to a team environment (or else is not shared in a team environment). Later, the user may need to return to the same file and make more changes. 6) A shared team version of the resource is more recent that the version currently in the workspace (i.e., an incoming change). In a team environment, it is a good practice to release and catch-up as frequently as possible to identify any side effects of a user's own changes or someone else's changes. In one embodiment of the present invention, a single filter can combines some or all of these exemplary tests 1-6. Such a filter would be defined as:

A resource "r" needs to be filtered if:

NOT(P1(r) OR P2(r) OR P3(r) OR P4(r) OR P5(r) OR P6(r))

While resources may be any resource displayed by the IDE, for exemplary purposes herein, these resources are described as binaries.

Figure 1:
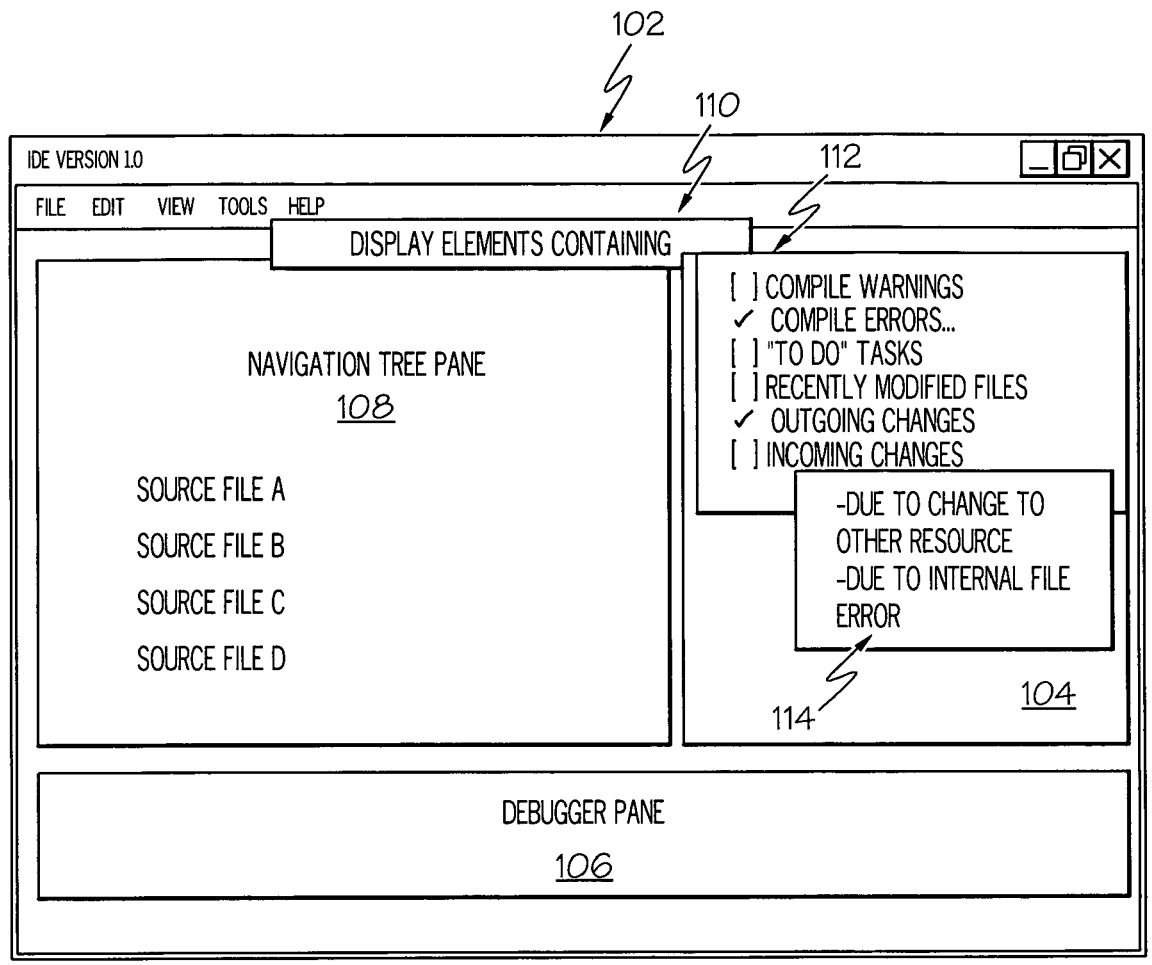
FIG. 1 illustrates drop-down menus for selecting criteria of resources to be displayed in an Integrated Development Environment (IDE) User Interface (UI) in accordance with the teachings of the present invention.

With reference now to the figures, and in particular to FIG. 1, there is depicted an exemplary User Interface (UI) 102 for an Integrated Development Environment (IDE) application. The UI 102 includes a text editor pane 104, into which source code is typed and edited, and a debugger pane 106, which displays errors and their location in the code when the source code is compiled. UI 102 also includes a navigation tree pane 108, which displays, in a tree manner, some or all files available to a developer who is using the IDE. In FIG. 1, navigation tree pane 108 displays Source files A-D, which populate a current workspace. Note that the UI 102 depicted is for exemplary purposes only, and any IDE UI (or non-IDE UI) having a navigation tree pane may use the present invention.

Figure 2A:
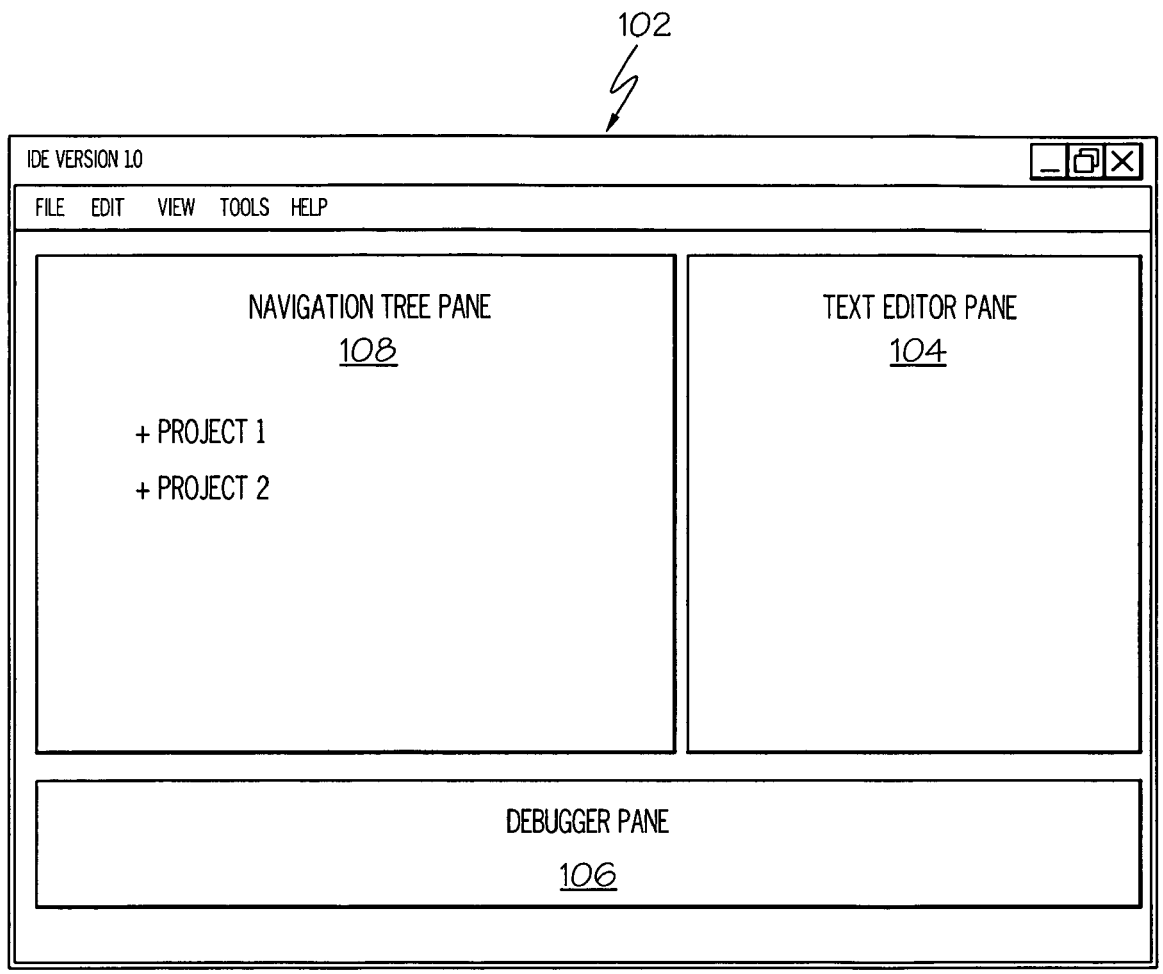
FIG. 2a depicts a display in an IDE navigation tree of folders that have sub-folders that meet at least one of the selected criteria.
Figure 2B:
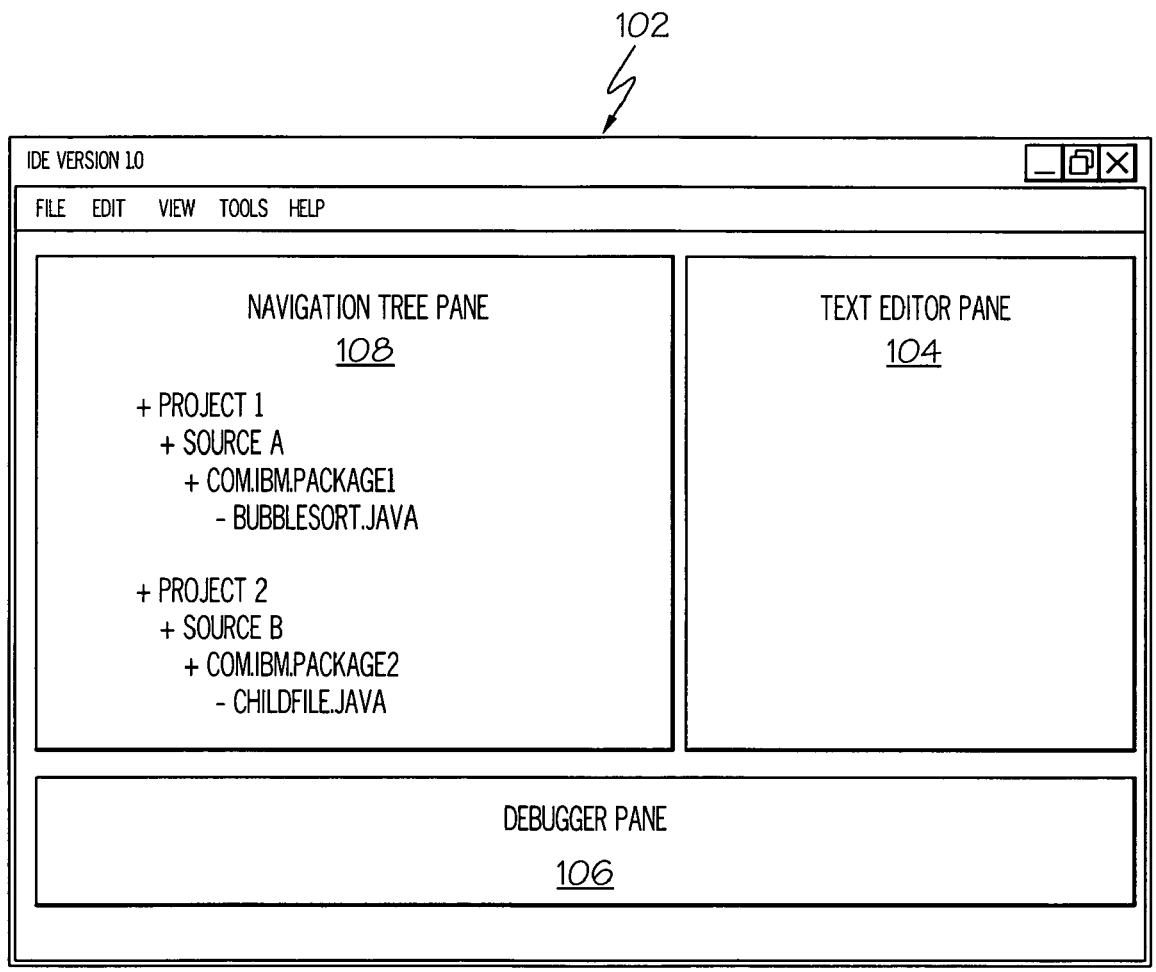
FIG. 2b illustrates the IDE navigation tree after being automatically expanded until a sub-folder that meets the selected criteria are displayed.

As shown in FIG. 1, a pop-up pane 110 (which may be pulled up by hovering over an active area of UI 102, or alternatively may be a drop-down menu from the "Tools" menu), shows an option to display elements which meet at least one of the criteria shown in menu 112 and sub-menu 114. That is, a user selects which resources are to be displayed in the navigation tree pane 108 according to which criteria for those resources are selected. For example, consider the example in which the user selects "Compile Errors . . . " from menu 112 and "Due to change to other resource" (assuming that this can be determined by the compiler) in the user's workspace from sub-menu 114. Then, as shown in FIG. 2a, the folders for "project 1" and "project 2" are displayed in navigation tree pane 108. This signifies that one of the sub-folders of the represented folders contains a resource that has a compile error due to a change to another resource in the user's workspace. In one embodiment, the resource that actually contains this error is displayed by automatically expanding the project folders until the resource meeting the user-selected criteria is reached, as shown in FIG. 2b. That is, the sub-folder representing the file "BubbleSort.java" and the IBM WebSphere® package "childfile.java" are automatically displayed, indicating that these are the files that actually have a compile error. Note also that these errors were caused by changes to (or errors in) other resources in the user's workspace, since this option was chose above with reference to sub-menu 114 in FIG. 1.

Figure 3A:
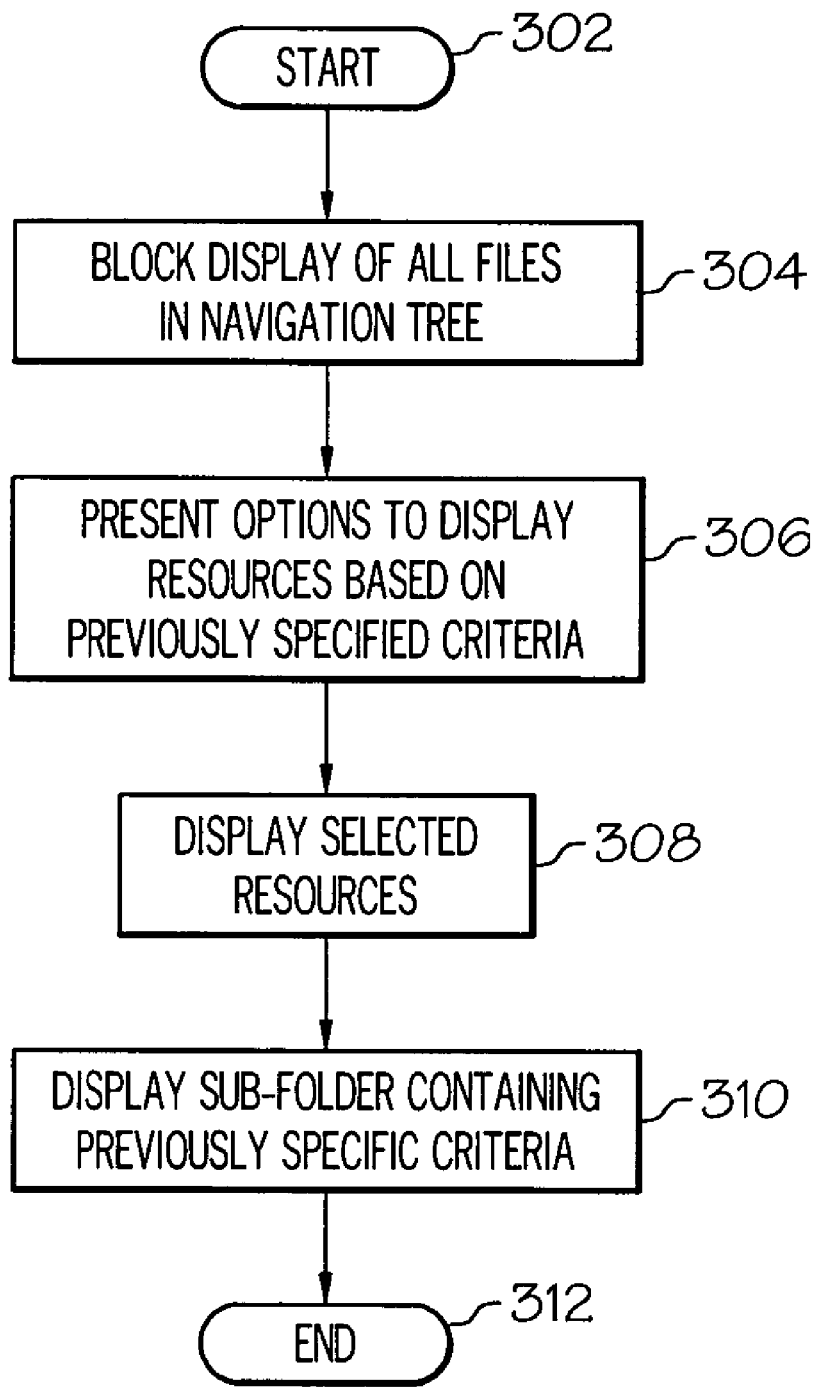
FIG. 3a is a flow-chart of exemplary steps taken in an embodiment of the present invention.

Referring now to FIG. 3a, a flow-chart of exemplary steps taken in the present invention is presented. After initiator block 302, a display in the navigation tree of all resources (files) is blocked (block 304). As described at block 306, an option of previously specified criteria (such as shown in the example of drop-down pane 112 in FIG. 1) is presented. The previously specified criteria that is chosen may be, but is not limited to, an uncommitted outgoing change to a shared team repository of resources, whether the resource has an error (e.g., a compile error), if a compile error was caused by a change to another IDE resource that has been modified, whether the IDE resource has a displayed compile warning, if the IDE resource has a user-defined marker indicating that a user-defined action needs to be taken for the IDE resource (e.g., the IDE resource needs to be placed on a "ToDo" list of resources that needs to be exported, debugged, etc.), if the IDE resource has been committed to a shared team environment, or if the IDE resource reflects an incoming change to the IDE resource from a shared team environment (e.g., the IDE resource has been modified by another team member who shares resources with a local developer). Based on the selected criteria (and whether any IDE resources match the selected criteria), the IDE resources meeting the chosen criteria are displayed (block 308) in the navigation tree pane (block 310), and the process ends (terminator block 312).

Figure 3B:
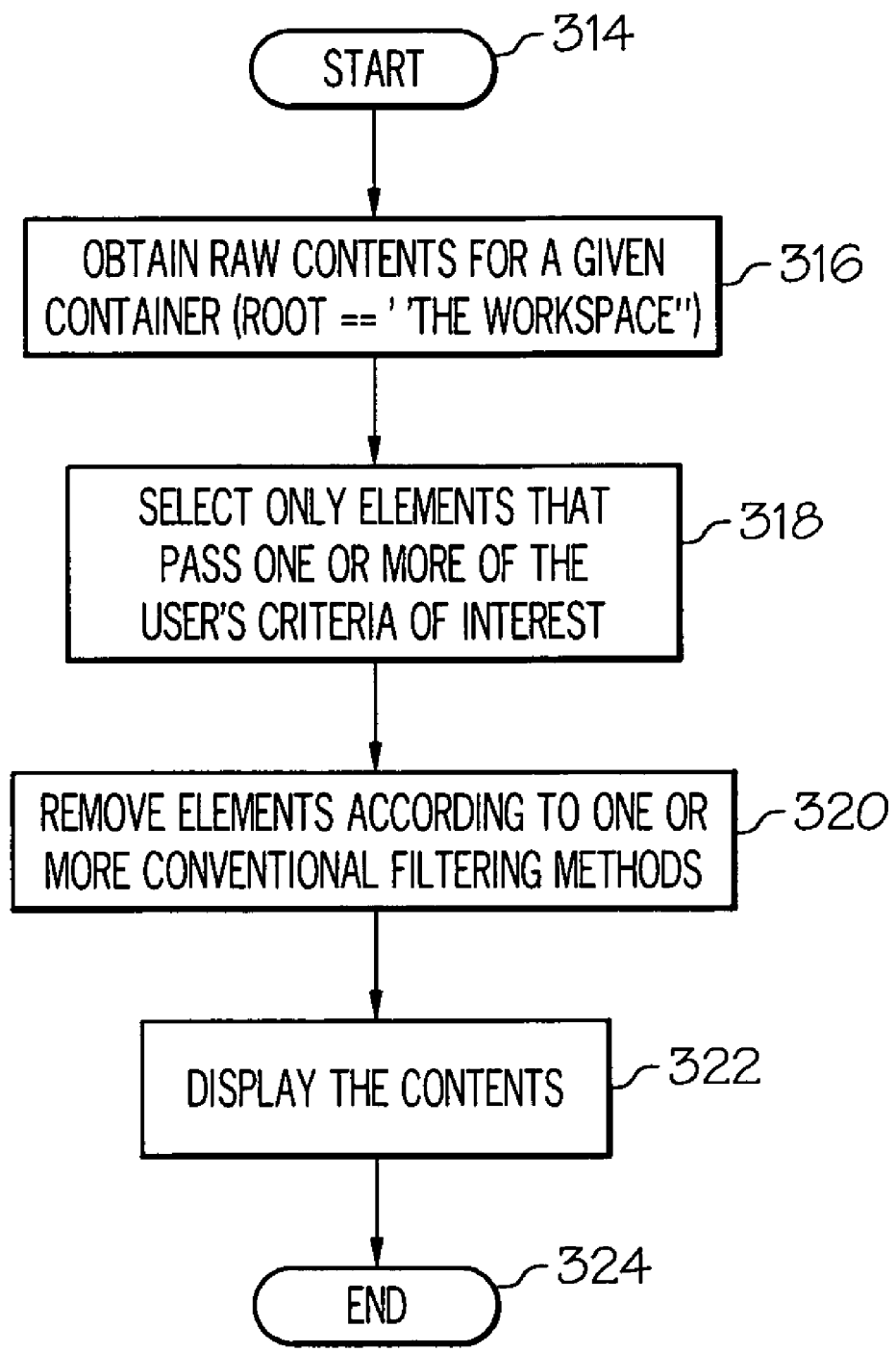
FIG. 3b presents additional detail of step 308 in FIG. 3a, and in particular with reference to populating an IDE navigation tree.

With reference now to FIG. 3b, additional detail of the action described in step 308 is presented, and in particular with reference to populating an IDE navigation tree. After initiator block 314, raw contents for a given container are obtained (e.g., root="the workspace"). As described in block 318, elements, in a given container, that pass one or more of the user's criteria of interest are selected. These criteria of interest may be any defined by the user, including but not limited to those describe herein. With reference to block 320, elements that are not of interest to the user are then filtered out (removed) using one or more filtering methods known to those skilled in the art of IDE creation and management. The IDE navigation tree, which now has filtered out elements that are not of interest to the user, is displayed (block 322), and the process ends (terminator block 324).

Figure 3C:
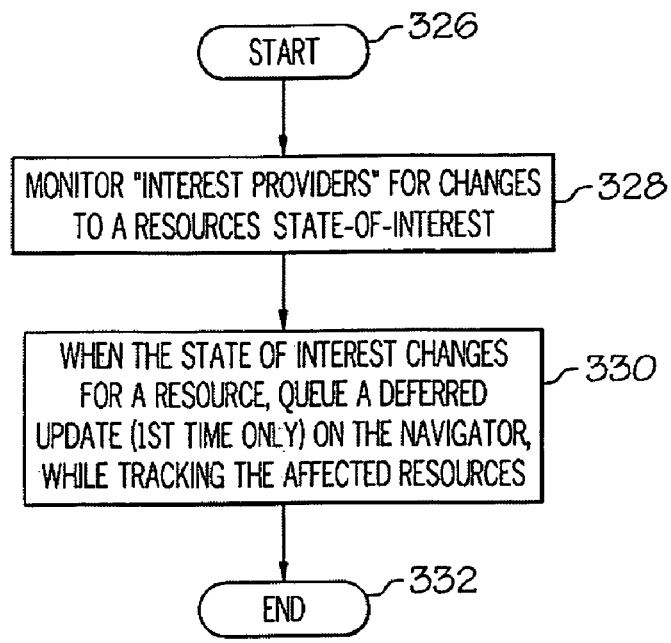
FIG. 3c presents additional detail of step 308 in FIG. 3a, and in particular with reference to responding to changes to an IDE navigation tree.

Referring now to FIG. 3c, additional detail is presented for responding to changes contemplated in step 308 in FIG. 3a. After initiator block 326, "Interest Providers" that describes a user's criteria of interest are monitored for changes to a resource's state-of-interest (block 328). As described in block 330, when a state of interest changes for a resource, a deferred update is queued on a navigator (first time only), while tracking any affected resources. An exemplary change to a state of interest is waiting for background processes (i.e., jobs) such as compilers to finish running before processing the update. Other changes to states of interest may also be contemplated within the present invention. The process ends at terminator block 332.

Figure 3D:
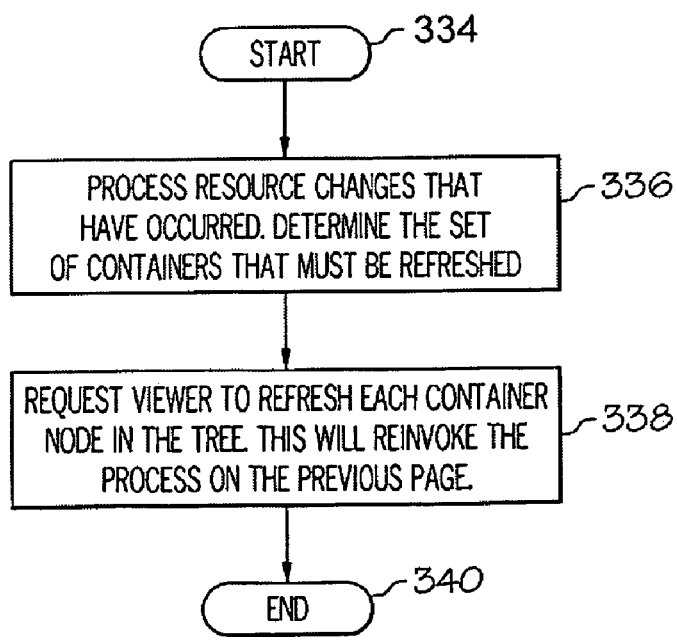

Referring to FIG. 3d, additional detail is presented for deferring updates to an IDE navigator tree. After initiator block 334, resource changes that have occurred are processed (executed), as described in block 336. A determination is made of which set(s) of containers must be refreshed according to the changes that occurred in the resourced changes and their processing. The viewer is then directed to refresh each container node in the IDE navigation tree (block 338), which reinvokes the process on the previous page. The process ends at terminator block 340.

Figure 4:
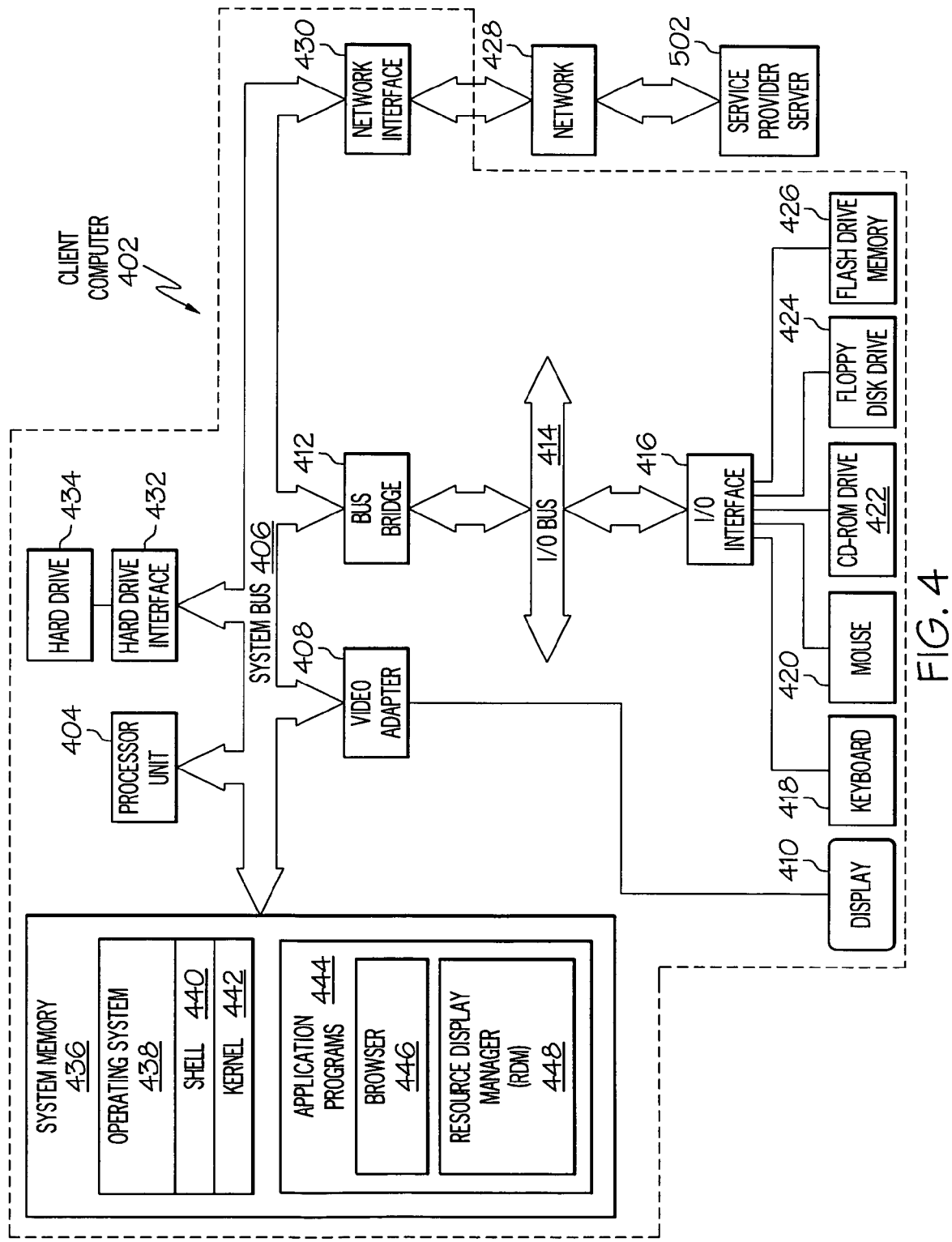
FIG. 4 depicts an exemplary client computer in which the present invention may implemented.

With reference now to FIG. 4, there is depicted a block diagram of an exemplary client computer 402, in which the present invention may be utilized. Client computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 502 via a network 428 using a network interface 430, which is coupled to system bus 406. Network 428 may be an external network such as the Internet, or an internal network such as an Ethernet or a Virtual Private Network (VPN). Using network 428, client computer 402 is able to use the present invention to access service provider server 502.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes client computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 502.

Application programs 444 in client computer 402's system memory also include a Resource Display Manager (RDM) 448. RDM 448 includes code for implementing the processes described in FIGS. 1-3d. In one embodiment, client computer 402 is able to download RDM 448 from service provider server 502.

The hardware elements depicted in client computer 402 are not intended to be exhaustive, but rather are representative to highlight essential components required by the present invention. For instance, client computer 402 may include alternate memory storage devices such as magnetic cassettes, Digital Versatile Disks (DVDs), Bernoulli cartridges, and the like. These and other variations are intended to be within the spirit and scope of the present invention.

As noted above, RDM 448 can be downloaded to client computer 402 from service provider server 502, shown in exemplary form in FIG. 5. Service provider server 502 includes a processor unit 504 that is coupled to a system bus 506. A video adapter 508 is also coupled to system bus 506. Video adapter 508 drives/supports a display 510. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk-Read Only Memory (CD-ROM) drive 522, a floppy disk drive 524, and a flash drive memory 526. The format of the ports connected to I/O interface 516 may be any known to those skilled in the art of computer architecture, including but not limited to Universal Serial Bus (USB) ports.

Service provider server 502 is able to communicate with client computer 402 via network 428 using a network interface 530, which is coupled to system bus 506. Access to network 428 allows service provider server 502 to execute and/or download RDM 448 to client computer 402.

System bus 506 is also coupled to a hard drive interface 532, which interfaces with a hard drive 534. In a preferred embodiment, hard drive 534 populates a system memory 536, which is also coupled to system bus 506. Data that populates system memory 536 includes service provider server 502's operating system 538, which includes a shell 540 and a kernel 542. Shell 540 is incorporated in a higher level operating system layer and utilized for providing transparent user access to resources such as application programs 544, which include a browser 546, and a copy of RDM 448 described above, which can be deployed to client computer 402.

The hardware elements depicted in service provider server 502 are not intended to be exhaustive, but rather are representative to highlight essential components required by the present invention. For instance, service provider server 502 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 502 performs all of the functions associated with the present invention (including execution of RDM 448), thus freeing client computer 402 from using its resources.

It should be understood that at least some aspects of the present invention may alternatively be implemented in a computer-useable medium that contains a program product. Programs defining functions on the present invention can be delivered to a data storage system or a computer system via a variety of signal-bearing storage media, which include, without limitation, non-writable storage media (e.g., CD-ROM) and writable storage media (e.g., hard disk drive, read/write CD ROM,). It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of RDM 448, are performed by service provider server 502. Alternatively, RDM 448 and the method described herein, and in particular as shown and described in FIGS. 1-3d, can be deployed as a process software from service provider server 502 to client computer 402. Still more particularly, process software for the method so described may be deployed to service provider server 502 by another service provider server (not shown).

Figure 6A:
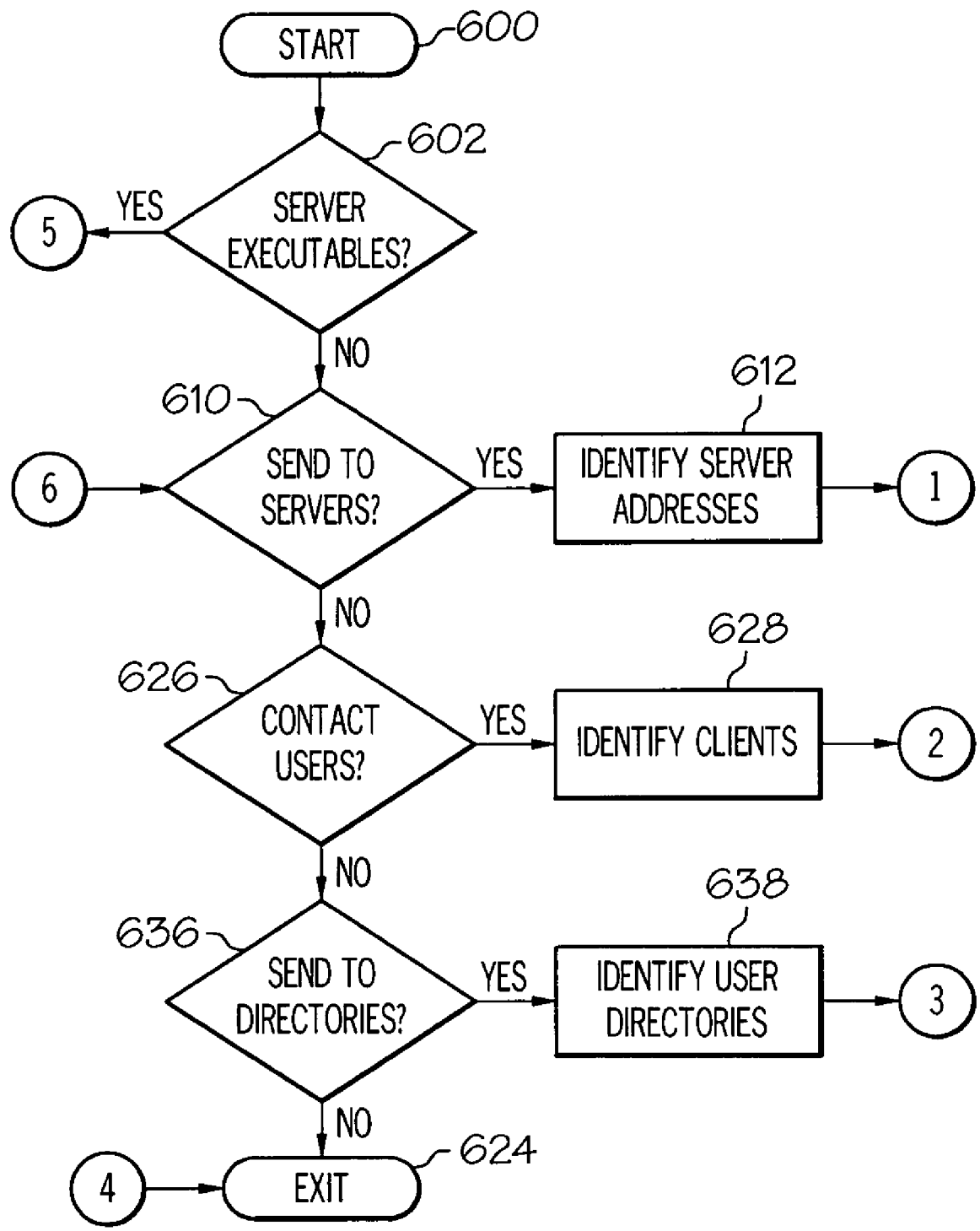
FIGS. 6a-b show a flow-chart of steps taken to deploy software capable of executing the steps shown and described in FIGS. 1-3d.
Figure 6B:
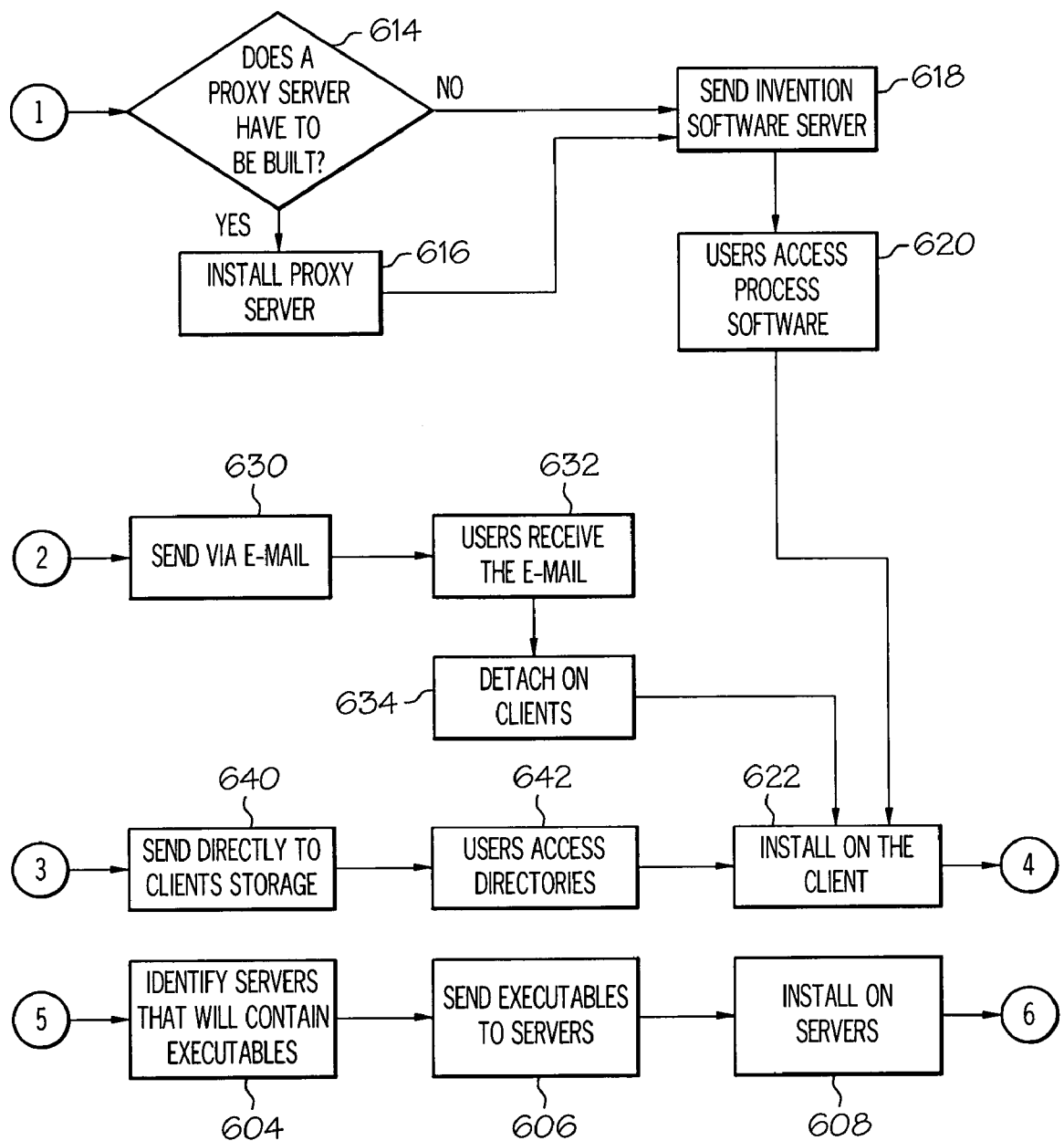

Referring then to FIGS. 6a-b, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling, which is the process of placing an entire packet within another packet and sending it over a network. The protocol of the outer packet is understood by the network and both points, called runnel interfaces, where the packet enters and exits the network.

Figure 7A:
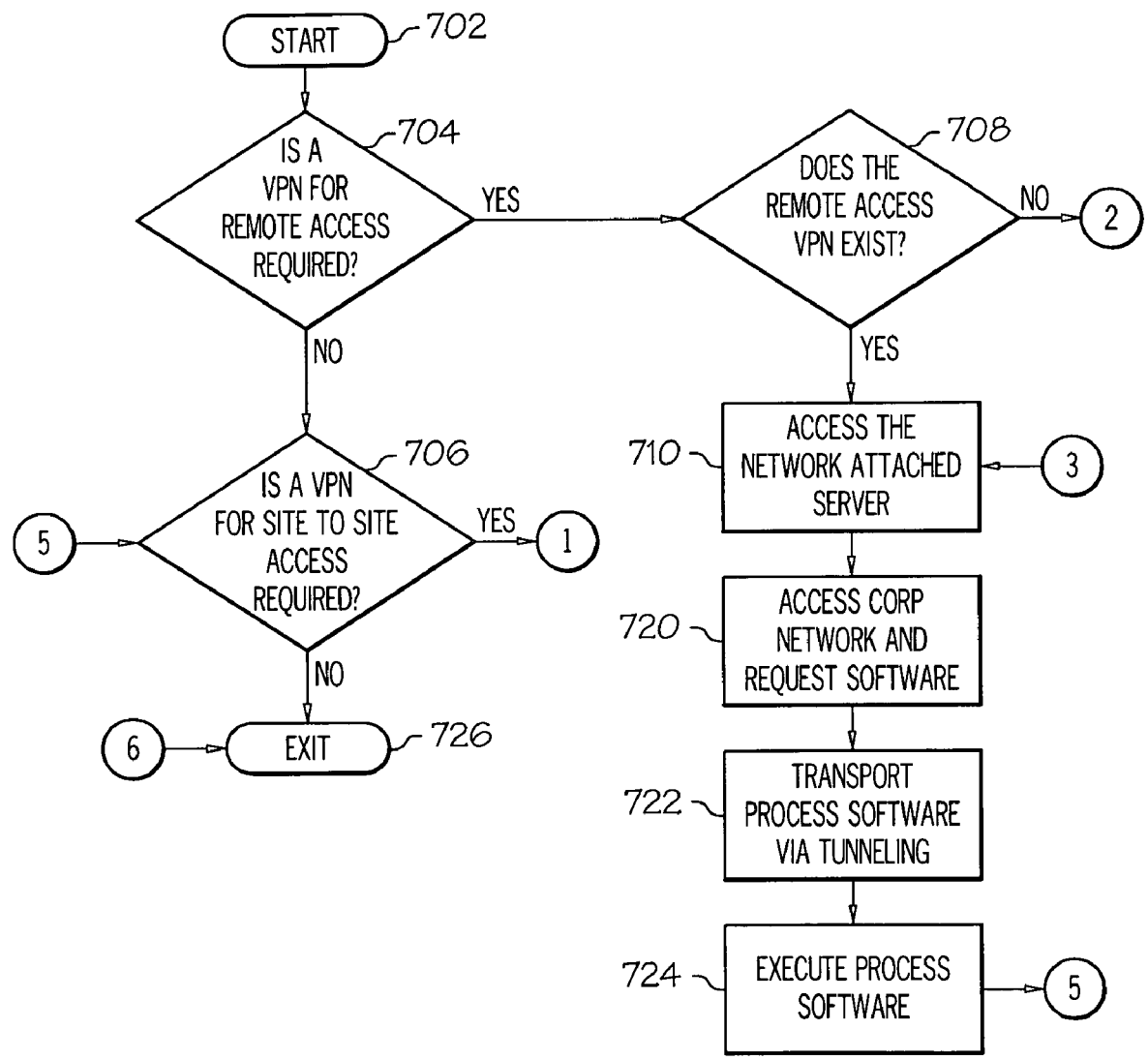
FIGS. 7a-c show a flow-chart of steps taken to deploy in a Virtual Private Network (VPN) software that is capable of executing the steps shown and described in FIGS. 1-3d.
Figure 7B:
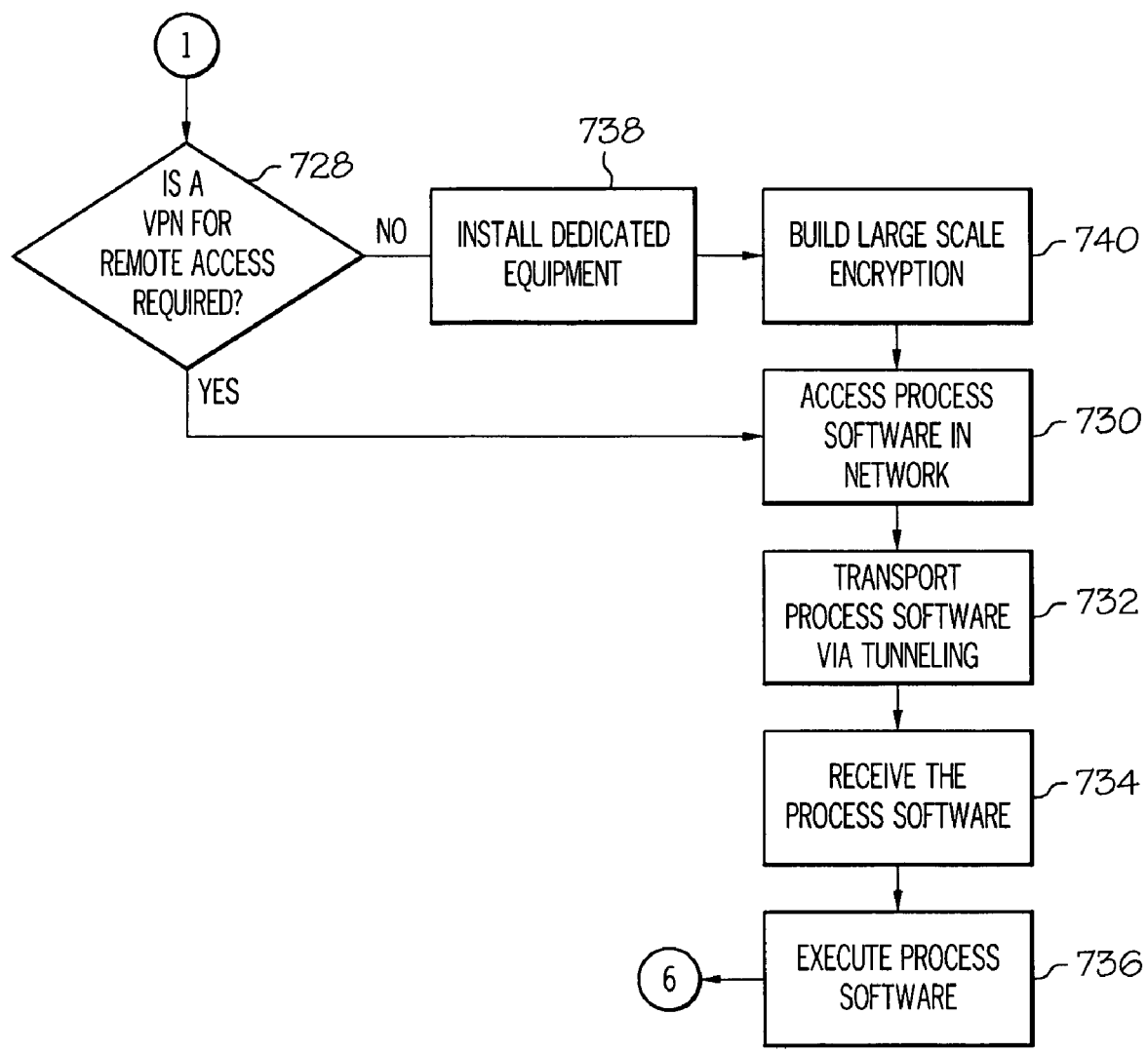
Figure 7C:
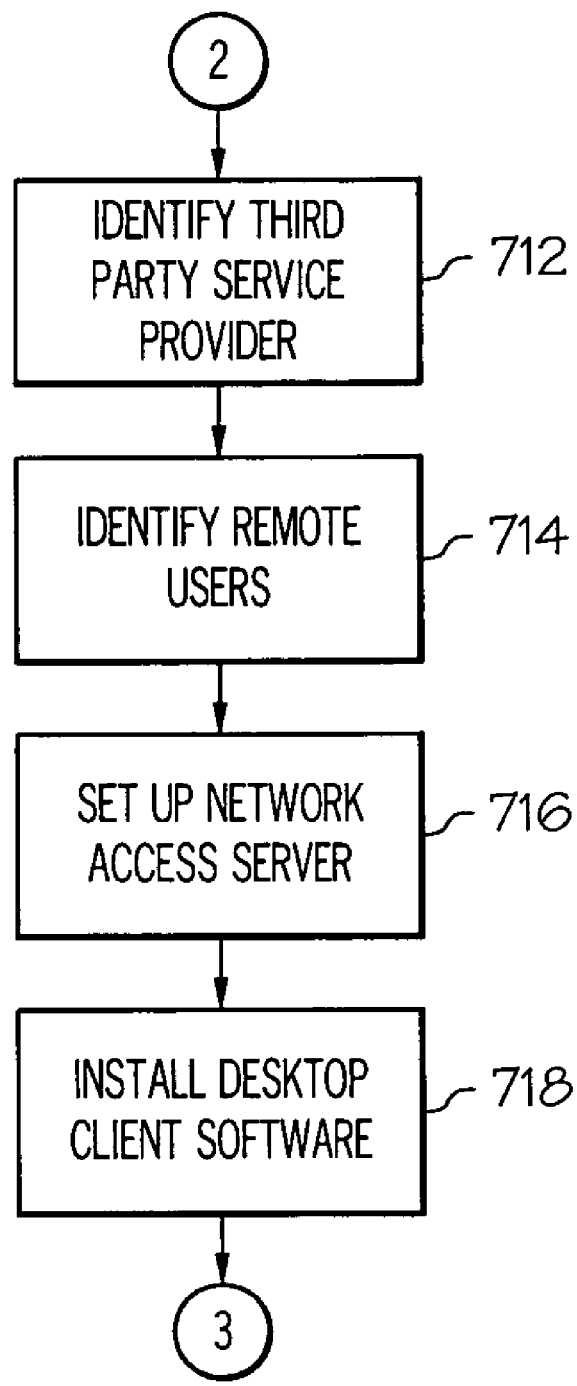

The process for such VPN deployment is described in FIGS. 7a-c. Initiator block 702 begins the Virtual Private Network (VPN) process. A determination is made to see if a VPN for remote access is required (query block 704). If it is not required, then proceed to (query block 706). If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is the process software is divided into packets and each packet including the data and protocol is placed within another packet (block 722). When the process software arrives at the remote user's desk-top, it is removed from the packets, reconstituted and then is executed on the remote users desk-top (block 724).

A determination is then made to see if a VPN for site to site access is required (query block 706). If it is not required, then proceed to exit the process (terminator block 726). Otherwise, determine if the site to site VPN exists (query block 728). If it does exist, then proceed to block 730. Otherwise, install the dedicated equipment required to establish a site to site VPN (block 738). Then build the large scale encryption into the VPN (block 740).

After the site to site VPN has been built or if it had been previously established, the users access the process software via the VPN (block 730). The process software is transported to the site users over the network via tunneling (block 732). That is the process software is divided into packets and each packet including the data and protocol is placed within another packet (block 734). When the process software arrives at the remote user's desktop, it is removed from the packets, reconstituted and is executed on the site users desk-top (block 736). The process then ends at terminator block 726.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8A:
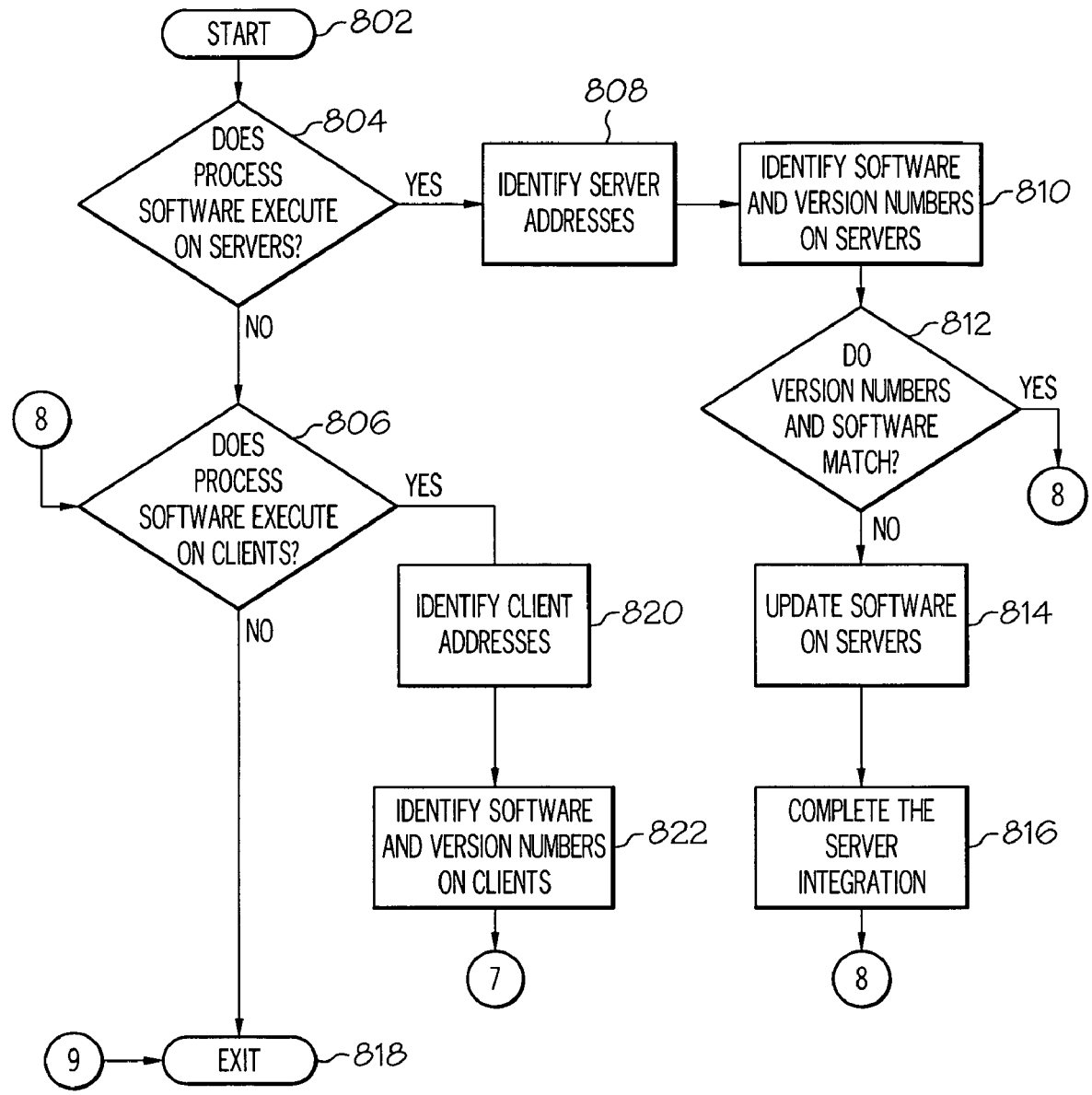
FIGS. 8a-b show a flow-chart showing steps taken to integrate into a computer system software that is capable of executing the steps shown and described in FIGS. 1-3d.
Figure 8B:
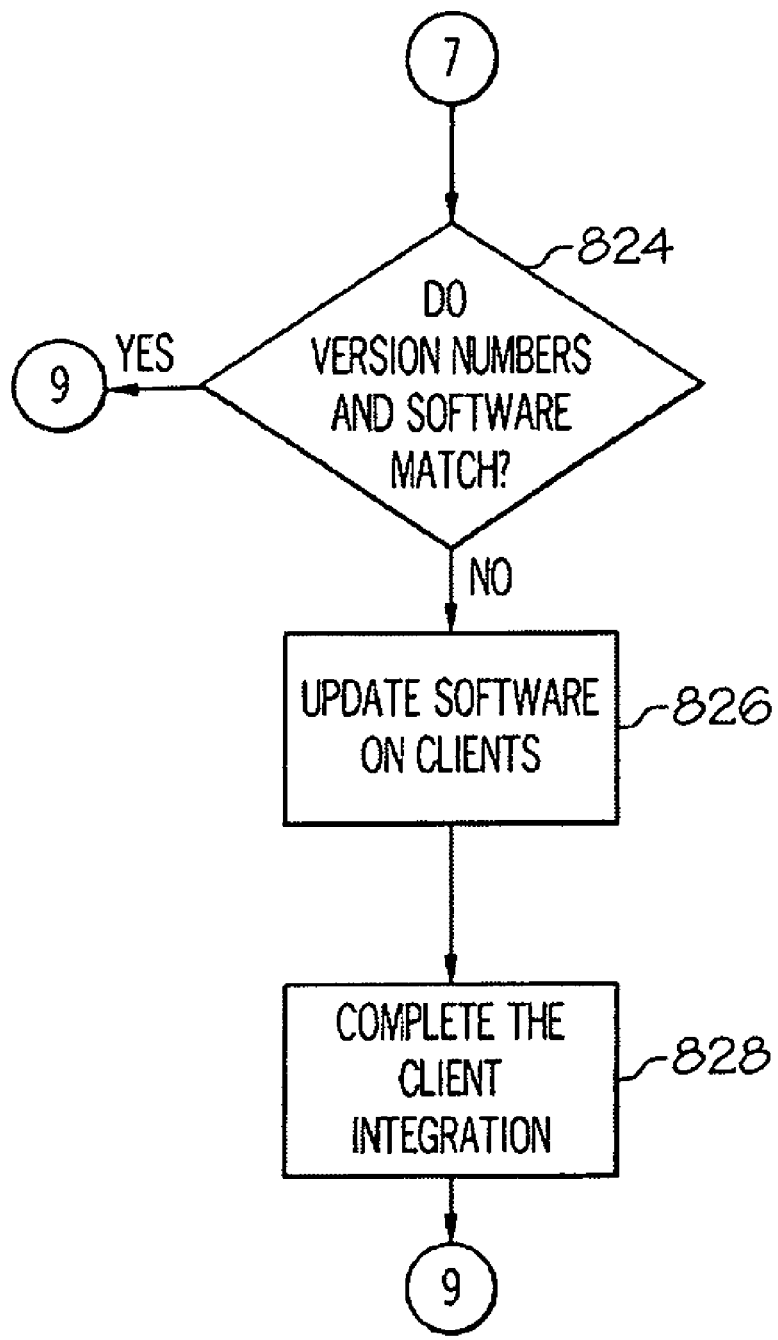

For a high-level description of this process, reference is now made to FIGS. 8*a*-*b*. Initiator block 802 begins the integration of the process software. The first tiling is to determine if there are any process software programs that will execute on a server or servers (block 804). If this is not the case, then integration proceeds to query block 806. If this is the case, then the server addresses are identified (block 808). The servers are checked to see if they contain software that includes the operating system (OS), applications, and network operating systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally, if there is missing required software, then it is updated on the server or servers in the step shown in block 814. The server integration is completed by installing the process software (block 816).

The step shown in query block 806, which follows either the steps shown in block 804, 812 or 816 determines if there are any programs of the process software that will execute on the clients. If no process software programs execute on the clients the integration proceeds to terminator block 818 and exits. If this not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made if the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9A:
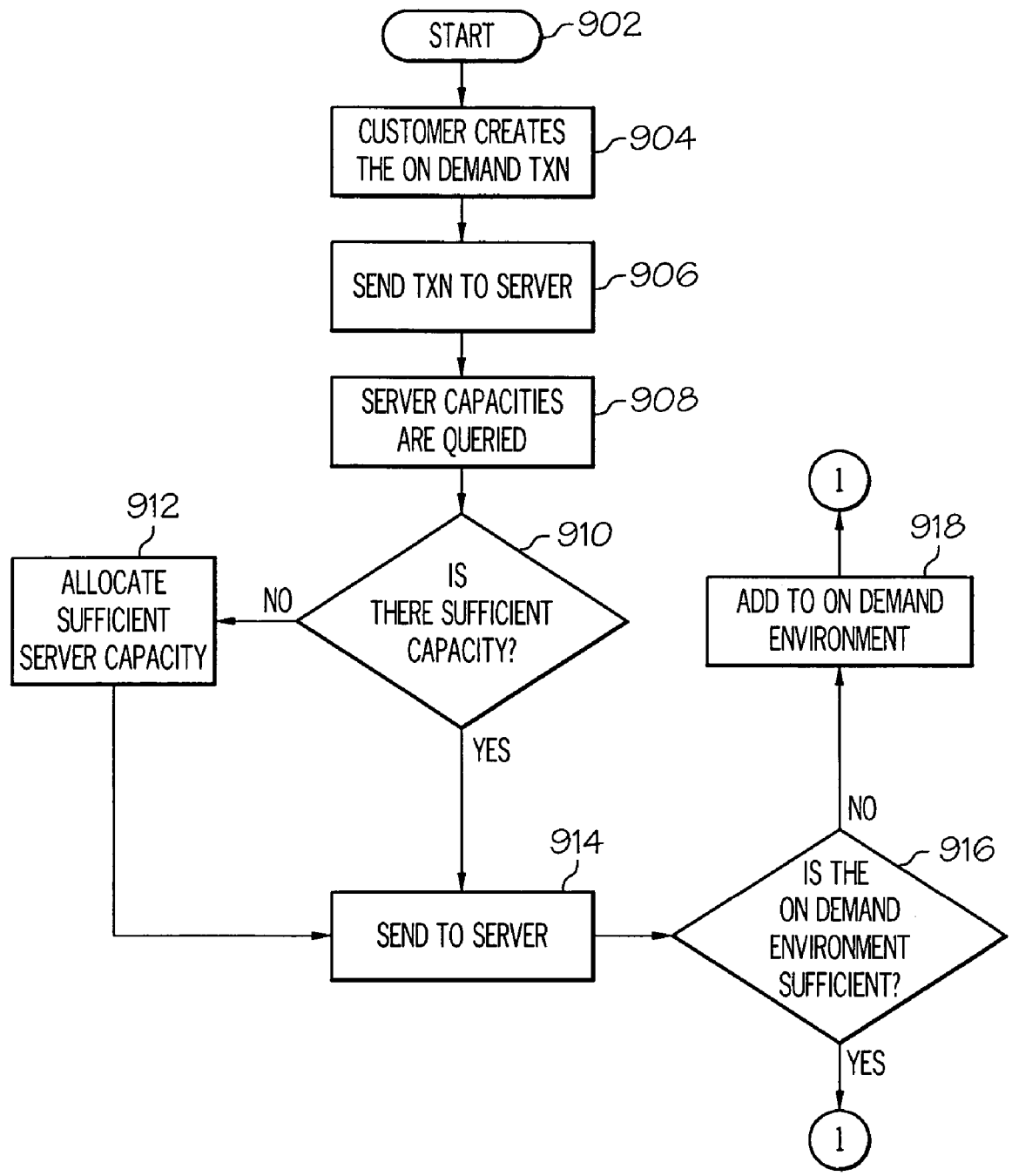
FIGS. 9a-b show a flow-chart showing steps taken to execute the steps shown and described in FIGS. 1-3d using an on-demand service provider.
Figure 9B:
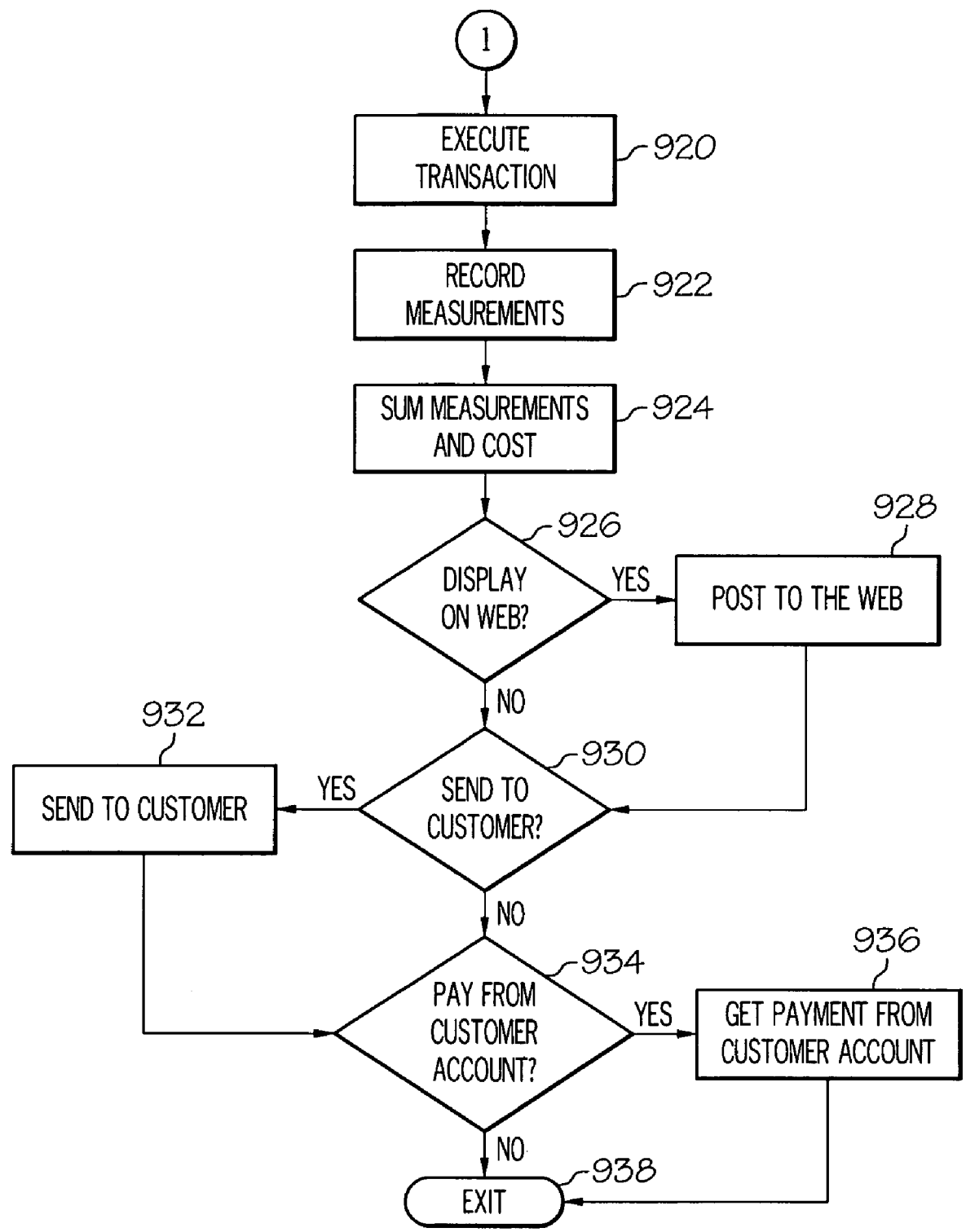

With reference now to FIGS. 9a-b, initiator block 902 begins the On Demand process. A transaction is created than contains the unique customer identification, the requested service type and any service parameters that further, specify the type of service (block 904). The transaction is then sent to the main server (block 906). In an On Demand environment the main server can initially be the only server, then as capacity is consumed other servers are added to the On Demand environment.

The server central processing unit (CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient Available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

The present invention thus presents a method, system, and computer-readable medium for managing a navigation tree in an IDE. One embodiment of the invention includes the steps of receiving an input that defines a user's criterion for viewing a resource in an Integrated Development Environment (IDE) navigation tree; and displaying, in the IDE navigation tree, only resources in a workspace of a user that meet the user's criterion. Furthermore, the method may include the steps of displaying a folder in the IDE navigation tree that contains the resource that meets the user's criterion; and (automatically or manually) expanding the folder until a sub-folder that meets the user's criterion is displayed, wherein the user's criterion for a resource to be displayed is an uncommitted outgoing change to a resource in a shared team repository of resources. The user's criterion for a resource to be displayed may be a compile error in the resource, including the scenario in which the compile error was caused by a change to another IDE resource. In addition, the user's criterion for a resource to be displayed may be a compile warning for the resource, that a resource to be displayed has a user-defined marker indicating that a user-defined action needs to be taken for the resource, that the resource has been committed to a shared team environment, or that the resource reflects an incoming change to an IDE resource from a shared team environment. The incoming change to the IDE resource may be monitored by a service, wherein the service processes the incoming change in a deferred manner to improve performance of a system.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method of managing presentation of resources to a user via an Integrated Development Environment (IDE) User Interface (UI), the computer-implemented method comprising:

initially blocking all data resources from view in an Integrated Development Environment (IDE) User Interface (UI);

subsequently displaying only resources that are of interest to a user on the IDE UI, wherein displayed resources include only resources that meet criteria that describe the displayed resources as being resources that:

a) the user has already modified and needs to commit to a shared environment, b) have compile errors in them that were caused by changes to other resources the user has modified, wherein the displayed resources are in a first sub-folder and the other resources are in a second sub-folder;
c) have an uncommitted outgoing change to a shared team repository of resources,
d) are actively being worked on in the IDE by the user,
e) have a "ToDo" resource marker directed at the user, wherein the "ToDo" resource marker indicates that a particular resource needs to be exported to another developer,
f) have been modified by the user and committed to a team environment,
g) are identified as a being from a shared team version that is more recent than a latest version created by the user, and
h) are waiting for a compiler to finish running in order to be updated, wherein the displayed resources are previously blocked data files that are subsequently displayed on the IDE UI using a reverse-filtering process, wherein the reverse-filtering process utilizes a single filter that incorporates resource parameters that have been selected by the user from a drop-down menu displayed on the IDE UI, wherein the resource parameters match said criteria for the displayed resources, and wherein matching resources are displayed on the IDE UI;

displaying the second sub-folder on the IDE UI, wherein displaying the second sub-folder identifies a sub-folder location of an error-producing resource that caused a compile error to the displayed resources; and automatically expanding the first sub-folder while leaving the second sub-folder in an unexpanded format on the IDE UI, wherein expanding the first sub-folder reveals only resources that match said criteria while the error-producing resource from the second sub-folder remains concealed in the IDE UI.

2. The computer-implemented method of claim 1, wherein the resources are binaries.

3. A system comprising:
a processor;
a data bus coupled to the processor;
a memory coupled to the data bus; and
a computer-usable medium embodying computer program code, the computer program code comprising instructions executable by the processor and configured for:
initially blocking all data resources from view in an Integrated Development Environment (IDE) User Interface (UI);
subsequently displaying only resources that are of interest to a user on the IDE UI, wherein displayed resources include only resources that meet criteria that describe the displayed resources as being resources that:
a) the user has already modified and needs to commit to a shared environment,
b) have compile errors in them that were caused by changes to other resources the user has modified, wherein the displayed resources are in a first sub-folder and the other resources are in a second sub-folder,
c) have an uncommitted outgoing change to a shared team repository of resources,
d) are actively being worked on in the IDE by the user,
e) have a "ToDo" resource marker directed at the user, wherein the "ToDo" resource marker indicates that a particular resource needs to be exported to another developer,
f) have been modified by the user and committed. to a team environment,
g) are identified as a being from a shared team version that is more recent than a latest version created by the user, and
h) are waiting for a compiler to finish running in order to be updated, wherein the displayed resources are previously blocked data files that are subsequently displayed on the IDE UI using a reverse-filtering process, wherein the reverse-filtering process utilizes a single filter that incorporates resource parameters that have been selected by the user from a drop-down menu displayed on the IDE UI, wherein the resource parameters match said criteria for the displayed resources, and wherein matching resources are displayed on the IDE UI;

displaying the second sub-folder on the IDE UI, wherein displaying the second sub-folder identifies a sub-folder location of an error-producing resource that caused a compile error to the displayed resources; and automatically expanding the first sub-folder while leaving the second sub-folder in an unexpanded format on the IDE UI, wherein expanding the first sub-folder reveals only resources that match said criteria while the error-producing resource from the second sub-folder remains concealed in the IDE UI.

4. The system of claim 3, wherein the resources are binaries, and wherein the binaries are. a product of source code being compiled.

5. A tangible computer-usable medium on which is stored computer program code, the computer program code comprising computer executable instructions configured for:
initially blocking all data resources from view in an Integrated Development Environment (IDE) User Interface (UI);
subsequently displaying only resources that are of interest to a user on the IDE UI, wherein displayed resources include only resources that meet criteria, that describe the displayed resources as being resources that:
a) the user has already modified and needs to commit to a shared environment,
b) have compile errors in them that were caused by changes to other resources the user has modified, wherein the displayed resources are in a first sub-folder and the other resources are in a second sub-folder,
c) have an uncommitted outgoing change to a shared team repository of resources,
d) are actively being worked on in the IDE by the user,
e) have a "ToDo" resource marker directed at the user, wherein the "ToDo" resource marker indicates that a particular resource needs to be exported to another developer,
f) have been modified by the user and committed to a team environment,
g) are identified as a being from a shared team version that is more recent than a latest version created by the user, and
h) are waiting for a compiler to finish running in order to be updated, wherein the displayed resources are previously blocked data files that are subsequently displayed on the IDE UI using a reverse-filtering process, wherein the reverse-filtering process utilizes a single filter that incorporates resource parameters that have been selected by the user from a drop-down menu displayed on the IDE UI, wherein the resource parameters match said criteria for the displayed resources, and wherein matching resources are displayed on the IDE UI;

displaying the second sub-folder on the IDE UI, wherein displaying the second sub-folder identifies a sub-folder location of an error-producing resource that caused a compile error to the displayed resources; and automatically expanding the first sub-folder while leaving the second sub-folder in an unexpanded format on the IDE UI, wherein expanding the first sub-folder reveals only resources that match said criteria while the error-producing resource from the second sub-folder remains concealed in the IDE UI.

6. The tangible computer-usable medium of claim 5, wherein the resources are binaries.

* * * * *